United States Patent [19]

Hong

[11] Patent Number: 4,750,392

[45] Date of Patent: Jun. 14, 1988

[54] ADJUSTABLE TOOL HOLDER

[76] Inventor: Kwangil Hong, 13704 Osborne St., Arleta, Calif. 91331

[21] Appl. No.: 49,392

[22] PCT Filed: Jul. 29, 1985

[86] PCT No.: PCT/US85/01418

§ 371 Date: Mar. 12, 1987

§ 102(e) Date: Mar. 12, 1987

[51] Int. Cl.⁴ .................. B23B 29/04; B23B 29/02
[52] U.S. Cl. .................................. 82/36 R; 82/1.2; 82/1.5; 82/12; 407/75; 407/76; 407/81; 407/89
[58] Field of Search .............. 82/1.2, 1.4, 1.5, 36 R, 82/12; 407/75, 76, 81, 88, 89, 90, 98

[56] References Cited

U.S. PATENT DOCUMENTS

| | | | |
|---|---|---|---|
| 1,666,109 | 4/1928 | Sheberashenko | 407/83 |
| 2,125,005 | 7/1938 | Jearum | 407/74 |
| 2,496,583 | 2/1950 | Feaster | 82/36 R |
| 2,525,819 | 10/1950 | McGregor | 407/76 |
| 3,237,486 | 3/1966 | Gilbert et al. | 82/1.2 |
| 3,744,357 | 7/1973 | Anderson et al. | 82/12 |
| 3,813,970 | 6/1974 | Mitchell | 82/36 R |
| 3,918,333 | 11/1975 | Ebert et al. | 82/36 R |
| 4,057,884 | 11/1977 | Suzuki | 407/89 |

FOREIGN PATENT DOCUMENTS

| | | | |
|---|---|---|---|
| 709871 | 7/1941 | Fed. Rep. of Germany | 407/75 |
| 978734 | 4/1951 | France | 82/36 |

*Primary Examiner*—Frederick R. Schmidt
*Assistant Examiner*—William E. Terrell
*Attorney, Agent, or Firm*—Albert O. Cota

[57] ABSTRACT

A hollow housing (20) slidingly retains an extendable body (22) through an open end allowing forward and aft movement. A rotatable tool holding head (34) is adjustably connected to the body (22) and is free to rotate up to 180 degrees. Extendable adjustment in the form of a threaded shaft (44) and handwheel (46) provide the manual expansion movement by rotation of the wheel (46) located on the opposite end as the body (22). Radial movement is afforded by a similar handwheel (50) attached to the head (34) through a drive shaft (48). A slidable end (36) is attached to the head (34) and contains a removable cutting tool (38) that rotatably cuts away material from a rotated workpiece. In a variation of the body (20) an angular shape is added with or without a mounting slot. Also, a pair of servo motors (62) and (64) may replace the handwheels for electromechanical adjustment of the device incorporating another embodiment.

9 Claims, 3 Drawing Sheets

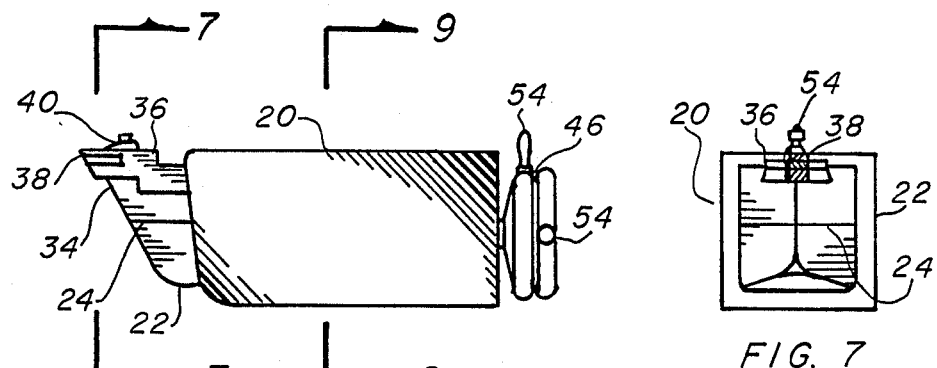
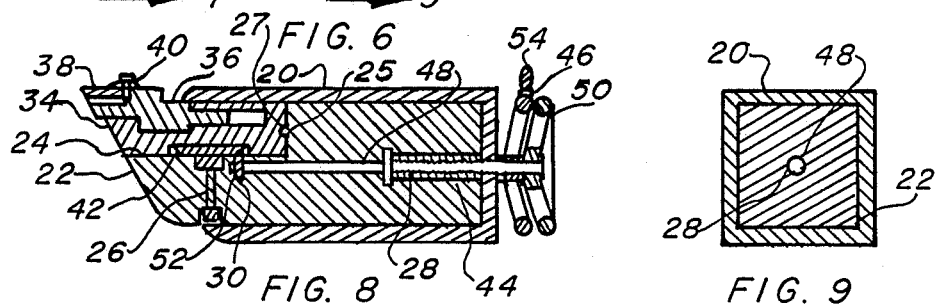
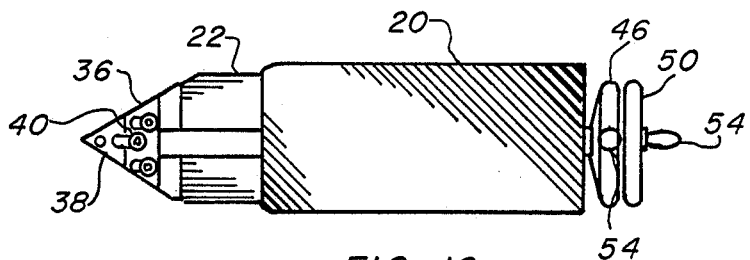
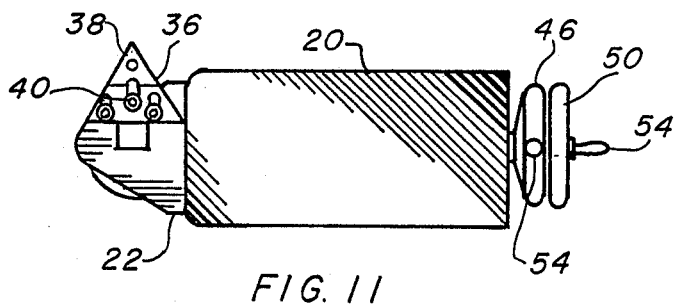

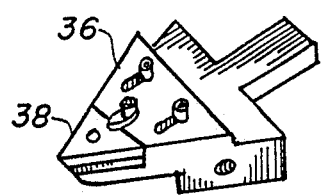
FIG. 12
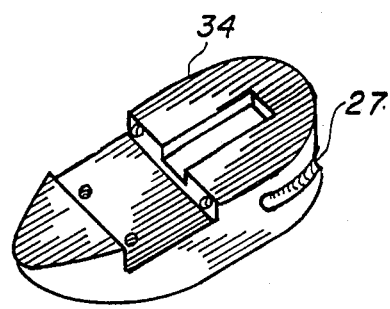
FIG. 13
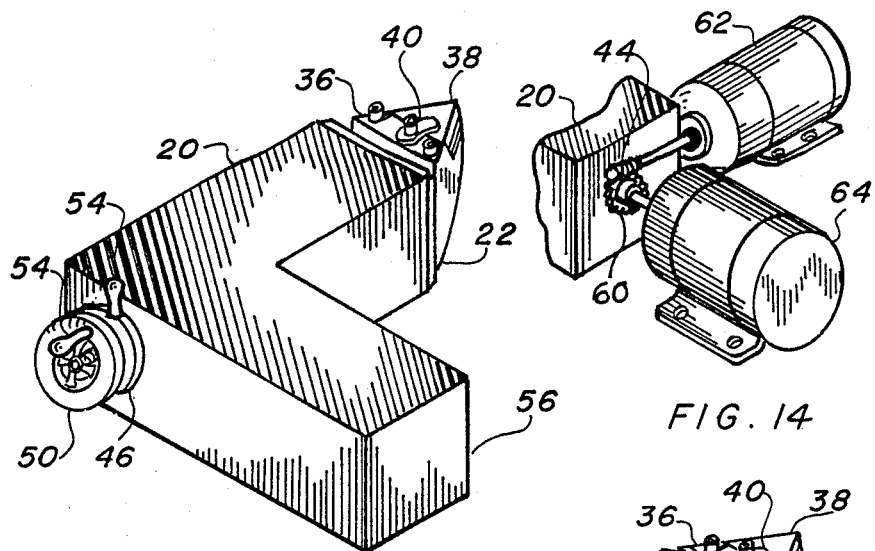
FIG. 15
FIG. 14
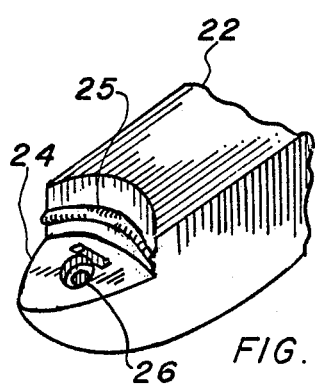
FIG. 17
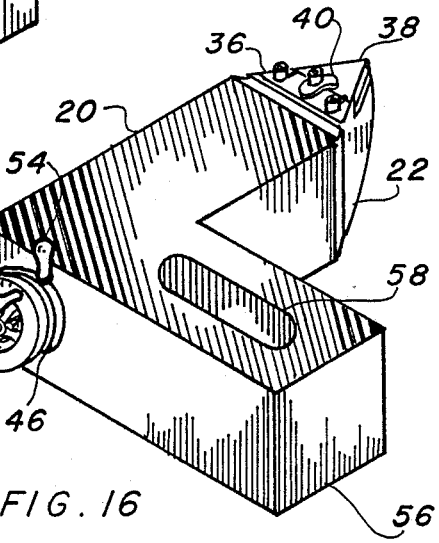
FIG. 16

ADJUSTABLE TOOL HOLDER

TECHNICAL FIELD

The present invention relates to tool holders for machine tools in general, and more specifically to cutting tool holders of an adjustable nature in both linear and rotary directions.

BACKGROUND ART

Previously, many types of tool holders have been developed to hold multiple and single point cutting tools with angular and radial tips. This includes boring bars and combination tools as well.

A search of the prior art did not disclose any patents that read directly on the claims of the instant invention, however, the following U.S. patents were considered related:

| U.S. Pat. No. | Inventor | Issue Date |
| --- | --- | --- |
| 4,057,884 | Suzuki | Nov. 15, 1977 |
| 3,148,561 | Krampert | Sep. 15, 1964 |
| 2,908,963 | Gollus | Oct. 20, 1959 |
| 2,573,480 | Nusshold | Oct. 30, 1951 |
| 2,125,005 | Jearum | Jul. 26, 1938 |
| 1,262,701 | Riedy | Apr. 16, 1918 |
| 1,015,903 | Mills et al | Jan. 30, 1912 |

Suzuki teaches a tool holder with a tool bit supporting member that is pivotally mounted within a bifurcated shank. An indexing device using a spring loaded detent with a ball is urged into one of a series of recesses for holding the supporting member into a predetermined angular orientation with no provisions for minor adjustments.

Krampert utilizes a plurality of graduated pan head machine screws disposed within threaded openings at equal angular orientation, adjustably positioning a tool bit that is inserted into a recess therebetween.

Gollus employs a tool holder for automatic forming machines that registers the tool bit, that has been ground to a profile shape, on the upper surface and one end. This allows the bit to be sharpened on the top surface and, as there is no top rake, the bit may be inserted into the holder and registered such that no shimming or realigning is necessary for further production. This is accomplished by using an angular face thrust wall and a pressure block engagable with the underside of the tool.

Nusshold applies a rectangular bar having a mouth with an elliptical cross-section in one end, also beveled on both ends, extending to the opposite end in communication with aligned longitudinal openings. A threaded rod is positioned inside with a handwheel and when rotated urges a tool that is inserted into the bar forward for linear adjustment of the tool location. A rod with a wedge shaped end also is utilized that is slideably positioned fore and aft, and grips the tool providing the adjustment from the end opposite the extending tool. Only linear adjustment is achieved with this invention.

Jearum takes advantage of a cutting bit integral with a shank that is slideably inserted within a shell having a threaded arrangement providing the fore and aft movement by the insertion of a tool within the shell opposite the cutting end. This allows the bit to be positioned accurately by the rotary urging of a manual auxillary tool.

Riedy and Mills et al are cited for background purposes as indicative of the art to which the invention relates.

DISCLOSURE OF THE INVENTION

Single point tools for cutting metals have historically been used on lathes, planers, shapers, boring mills, and turret lathes. Each tool consists of a shank and a point. Inasmuch as this device is the heart of the machine where the actual removal of material is accomplished, the ease of adjustment and speed in which angular orientation may be accomplished becomes of paramount importance. For example, typical bench lathes contain a compound slide rest with manual feed adjusting handwheels and a holder attached that retains the cutting tool, however, the tool holder is not adjustable in and of itself.

It is, therefore, a primary object of the invention to provide a device that, by manual adjustment, changes not only the linear fore and aft tool location, but also the radial position in one basic tool holder. As previously noted, prior art has attempted to fill the need for this capability, however, has not, as yet, been able to mechanically accomplish this task with a single unitary device. By changing the orientation of the cutting tip of the tool, the tooling becomes a boring bar for inside diameter cuts, as well as outside diametrical cuts. Although the rake angle of the tool is not altered, the side cutting edge angle and end cutting edge angle are changed manually without removing the tool from the holder. This feature facilitates the work of the operator in eliminating completely the set-up time normally required in this operational procedure.

An important object of the invention further allows this linear and radial adjustment to be accomplished at a single location. As manually operated handwheels are attached in tandum on the invention, the operator may move either wheel easily without looking away to separate locations. This advantage obviously reduces the time consumed by the operator as continual adjustment is required on many machining operations.

Another object of the invention provides easy adaptation to servo motors that remotely change the adjustment a predetermined amount, as governed by peripheral electronic equipment. With these motors attached to the device, adjustment becomes simple with repeatable programmable electronics now available to the user.

Still another object of the invention provides ease of adaptation using existing equipment. As tool holders are attached directly to adaptable members of the machine, simple replacement is required and adding a clamping arrangement for the invention with no actual modification necessary. This provides greater capabilities and flexibility of the machine tool with comparatively little added expense.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 6 is a side elevational view of the preferred embodiment.

FIG. 7 is a cross-sectional view taken along lines 7—7 of FIG. 6.

FIG. 8 is a cross-sectional view taken along lines 8—8 of FIG. 2.

FIG. 9 is a cross-sectional view taken along lines 9—9 of FIG. 6.

FIG. 10 is a plan view of the preferred embodiment in the extended postion.

FIG. 11 is a plan view of the preferred embodiment in the extended postion with the tool holding head rotated to the maximum angle.

FIG. 12 is a partial isometric view of the slideable end of the tool holding head completely removed from the invention for clarity.

FIG. 13 is a partial isometric view of the rotatable tool holding head assembly completely removed from the invention for clarity.

FIG. 14 is a partial isometric view of the tool holder with a pair of servo motors attached to drive the mechanical adjustment shafts.

FIG. 15 is a partial isometric view of the invention with an angular housing for attachment.

FIG. 16 is a partial isometric view of the invention with an angular housing having a slot therein.

FIG. 17 is a partial isometric of the extendable body completely removed from the invention for clarity.

BEST MODE FOR CARRYING OUT THE INVENTION

The best mode for carrying out the invention is presented in terms of a preferred embodiment with a manual or electromechanical adjustment and various methods of mounting.

Figure 1:
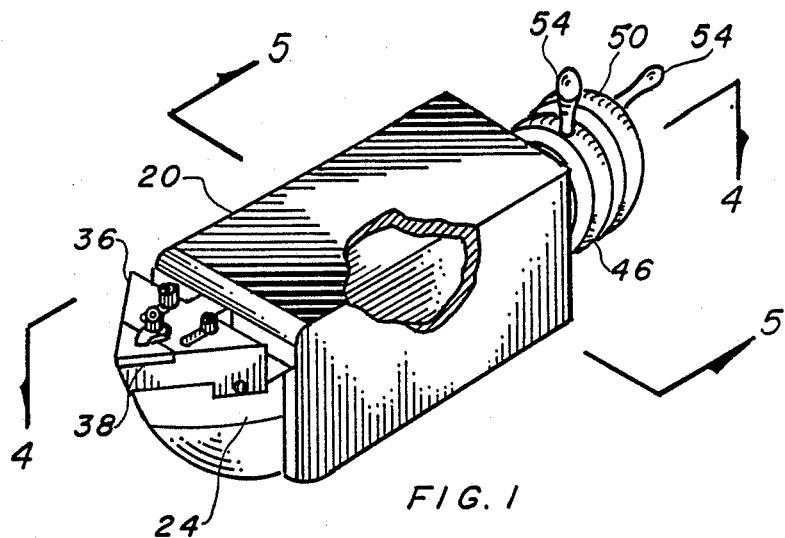
FIG. 1 is a partial isometric view of the preferred embodiment in the fully retracted position with the tool holding head adjusted partially forward.
Figures 2, 3:
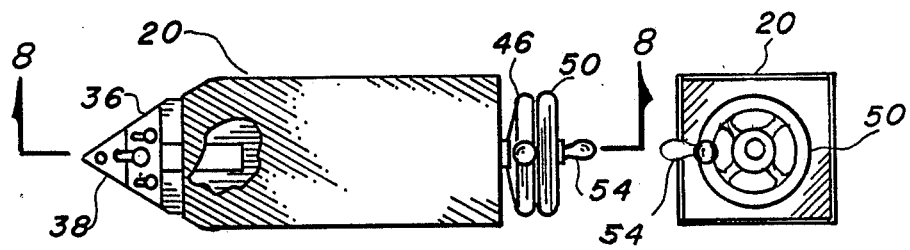
FIG. 2 is a plan view of the preferred embodiment retracted, as above.
FIG. 3 is an end view of the preferred embodiment.
Figures 4, 5:
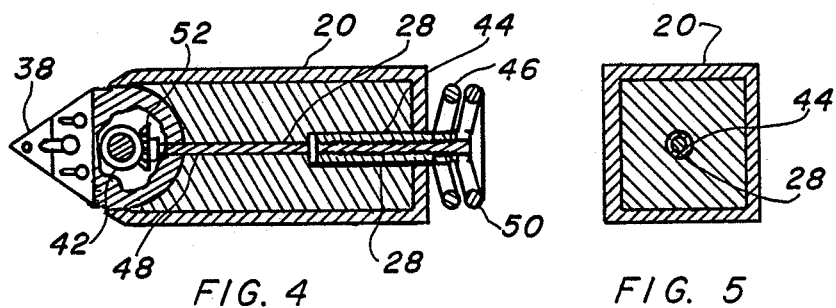
FIG. 4 is a cross-sectional view taken along lines 4—4 of FIG. 1.
FIG. 5 is a cross-sectional view taken along lines 5—5 of FIG. 1.

The preferred embodiment, illustrated in FIGS. 1 through 14 and 17, is comprised of a hollow housing 20 having one end open. This housing 20 is rectangular in shape with the open end beveled and is fabricated of metal, preferably steel. An extendable body 22, shown removed from the assembly in FIG. 17, is slideably disposed within the housing 20 and is similarly rectangular in shape, with one end having a radial recess 24 with a rib 25 projecting therefrom. The recessed side 24 is located near the end allowing a full 180 degree arc of travel, while the projecting side of the notch is pointed much like the bow of a boat. A stepped bore 26 is located at the apex of the radius penetrating the entire element with a reduced diameter in the middle. The body 22 is slightly smaller than the inside of the hollow housing 20 allowing forward and aft movement when fitted together in a slideable manner. The end opposite the recess 24 contains a centrally located cavity 28 that is threaded, perhaps the first third of the length, with the remainder a round hole interfacing the stepped bore 26. Near this interface a notch 30 is formed allowing a cavity for gearing.

A rotatable tool holding head assembly 34, illustrated separately in FIG. 13, is positioned within the recess 24 of the body 22 with the rib mating a similar radial end on the head 34 contiguously abutting for strength and rigidity. The upper portion of the head 34 is configured to retain a slideable end piece with a cutting tool 38 removably attached for holding this tool 38 in a radial fixed position. This slideable end is formally designated an adjustable insert tool holder 36 and is depicted by itself in FIG. 12. The holder 36 is in the shape of an arrowhead with a triangular shaped first end and a rectangular shank on the second end. A clamp 40, well known in the art, attaches the cutting tool 38 to the holder 36. The cutting tool 38 is usually of a special high speed steel, crobalt, stellite, sintered-carbide, etc., and each one could have a different rake angle, or relief angle, therefore, the holder 36 is configured to only a standard basic size and the clamp 40. applies the pressure to hold the tool in place, regardless of its form and construction. This arrangement allows easy removal and replacement of the tool in an obvious and expeditious manner. A beveled gear 42 is disposed within the underside of the head 34 allowing interface with the teeth on the periphery. This gear 42 allows axial adjustment, and the shape of the head is such that the grooves in both the body and the head provide the structural interface of sufficient integrity to maintain the adjustable feature of the invention without chatter digging or spalling of the turned workpiece. The configuration of the head 34 and the holder 36 allow a rotation of alost 180 degrees, as selected by the operator with infinite variations in angular disposition.

The entire body 22 is extendably adjusted in a linear fore and aft position from the housing 20. This movement is accomplished with the body 22 sized slightly smaller than the inside of the housing 20, providing a linear movement, yet retaining sufficient integrity of the assembled structure. Further, this movement changes the lateral portion of the cutting tool 38 in relation to the housing 20 without any mechanical adjustment of the machine tool. A threaded drive shaft 44 is connected to an extending drive handwheel 46 that penetrates through the housing 20 into the body 22 and threadably engages the appropriate portion of the cavity or stepped bore 28. This shaft 44 is rotatably retained at the interface with the housing 20, using means well known in the art, and as such urges the body 22 in the desired linear direction by manual rotation of the wheel 46. Calibrated vernier extension markings (not illustrated) may be added onto the side of the body 22 to indicate the amount of movement accomplished when the wheel 46 is rotated, thereby assisting the operator in the proper amount of extension.

The invention also has the capability of pivotally adjusting the cutting tool 38 in relation to the housing 20. This adjustment is accomplished by means not unlike the above, except a drive shaft 48 having a handwheel 50 on one end, and a beveled gear 52 on the other, is utilized. This assembly is disposed through the threaded drive shaft 44, and also the cavity 28 in the body 22. The retention of the gear 52 and handwheel 50 on each end maintains the position of the shaft 48 within the assembly and allows movement of the head assembly 34 when the handwheel 50 is manually rotated. A similar set of calibrated markings may be added, as above, to indicate the angle of the head 34.

Since both handwheels 46 and 50 are located together, the device may be easily manipulated by the operator in either mode, or a combination thereof. To further facilitate rapid adjustment, a knob 54 is provided on each handwheel 46 and 50 with the linear adjustment knob outwardly positioned, and the angular knob planar to the shaft 48. A variation in the mounting method is pictorially illustrated in FIG. 15 and is comprised of a solid integral appendage protruding at right angles from the housing 20 opposite the open end forming an L-shaped housing 56. This solid appendage is easily attached to the machine tool with compression clamps, well known in the art, and, existing on most tools. The angular configuration allows greater flexibility of installation on a wide variety of machine tools, further expanding the utility of the invention.

Another variation in the mounting method is shown in FIG. 16 and is exactly like the above, except a slot 58 is longitudinally positioned in the top allowing a threaded capscrew to be installed directly therethrough.

FIG. 14 illustrates another embodiment of the extendable adjustment means. The drive shaft 44, having threads for linear movement, utilizes in place of the drive wheel 46 a gear 60 that is attached on the end. A mating gear on a servo motor 62 is meshingly engaged thereupon producing linear movement of the body 22 forward and aft when the motor 62 is electrically energized rotating the gear train driven shaft 44. The radial adjustment means may also be electrically driven by the use of a servo gear motor 64 attached directly onto the shaft 48 in place of the manual drive wheel 50. When energized the servo gear motor 64 rotates the shaft 48 transmitting torque to the rotatable tool holding head 34.

Although the invention has been described in complete detail and pictorially shown in the accompanyings drawings, it is not to be limited to such details, since many changes and modification may be made to the invention without departing from the spirit and scope thereof. Hence, it is described to cover any and all modifications and forms which may come within the language and scope of the claims.

I claim:

1. An adjustable tool holding device for machine tools comprising:
   (a) a hollow housing having one end open,
   (b) an extendable body having an arcuate recess on one end, said body slideably disposed within said housing through said open end allowing longitudinal line fore and aft movement therewithin,
   (c) a pivoting tool holding head assembly contiguously abutting said arcuate recess of said body so as to be pivotable about an axis perpendicular to the longitudinal direction, said tool holding assembly having a cutting tool removably affixed thereon and holding said cutting tool in a radially fixed position, relative said axis
   (d) body adjustment means integrally disposed within said housing and extendable body for urging said body fore and aft within said housing controlling the longitudinal position of said cutting tool in relation to said housing; and,
   (e) tool holding head assembly adjustment means integrally disposed within said housing and extendable body for pivoting said tool holding head about said axis controlling the angular position of said cutting tool in relation to said housing.

2. The invention as recited in claim 1 wherein said extendable body further comprises: a stepped bore extending within providing cavities to receive said tool holding head assembly adjustment means and said radial adjustment means.

3. The invention as recited in claim 1 wherein said pivoting tool holding head assembly further comprises: an adjustable insert tool holder having a a clamp for holding said cutting tool, a beveled gear disposed within the underside of said head assembly interfacing with said radial adjustment means, and said head assembly having an arcuate groove on the end opposite said tool holder mating the rib on said body.

4. The invention as recited in claim 1 wherein said body adjustment means further comprises: a threaded drive shaft connected to an extending drive handwheel disposed within said body through said housing producing linear movement of said body forward and aft when the wheel is manually rotated.

5. The invention as recited in claim 1 wherein said tool holding head adjustment means further comprises: a drive shaft having a handwheel on one end and a beveled gear on the other disposed within said body through said housing producing pivotal movement of said head when the handwheel is manually rotated.

6. The invention as recited in claim 1 wherein said housing further comprises: a solid integral appendage protruding at right angles from said housing opposite the open end for attachment to said machine tool with clamps.

7. The invention as recited in claim 1 wherein said housing further comprises: a solid integral appendage having a slot longitudinally positioned therein protruding at right angles from said housing opposite the open end for attachment to said machine tool with threaded fasteners through the slot.

8. The invention as recited in claim 1 wherein said body adjustment means further comprises: a threaded drive shaft having a gear on one end disposed within said body through said housing, and a servo motor having a gear on the shaft thereof drivingly connected to said drive shaft gear producing linear movement of said body forward and aft when the motor is energized.

9. The invention as recited in claim 1 wherein said tool holding head adjustment means further comprises: a drive shaft having a beveled gear on one end and a direct connected servo gear motor on the other disposed within said body through said housing producing movement of said head when the gear motor is energized rotating the shaft, transmitting torque to said tool holding head.

* * * * *